Oct. 7, 1958

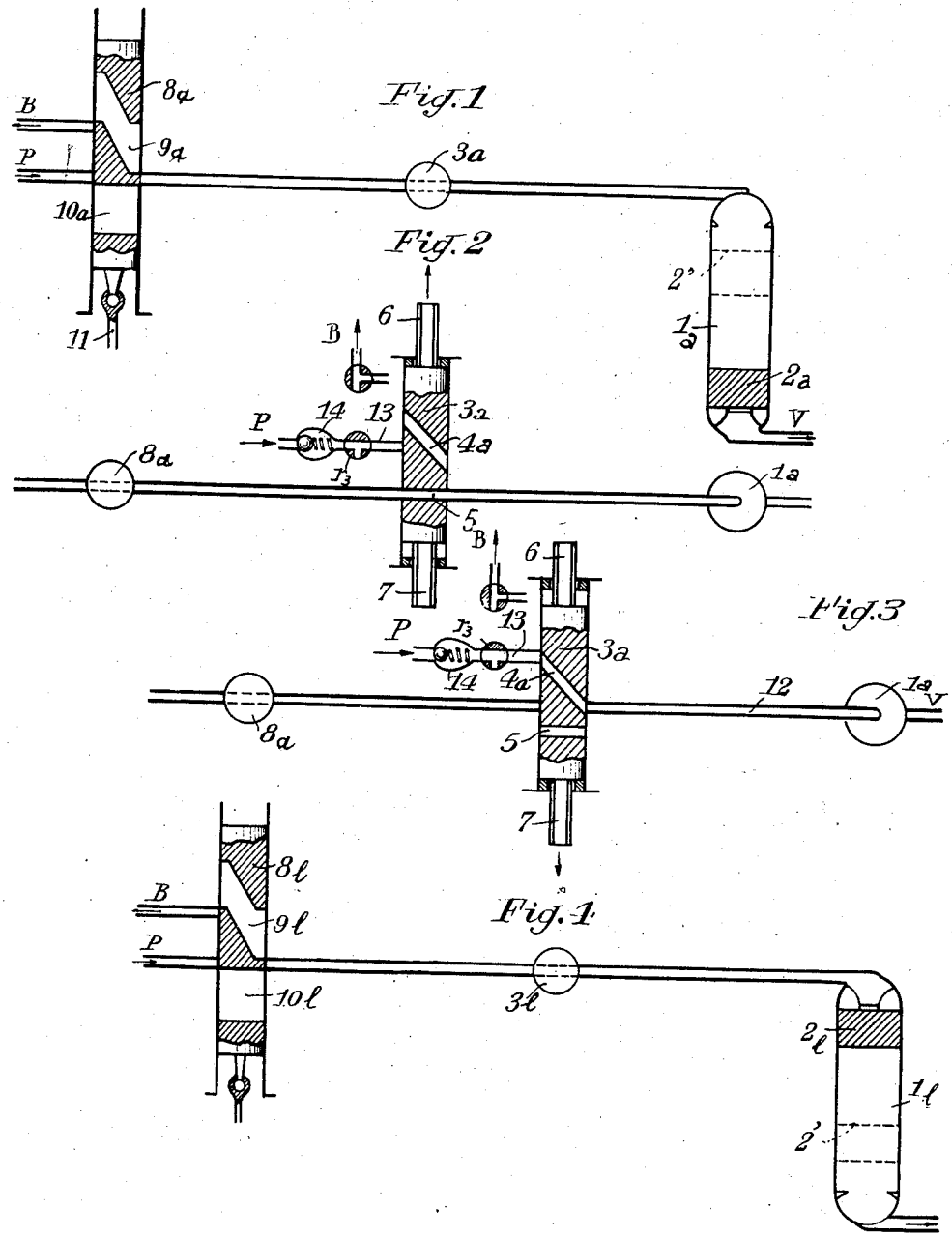

G. BOULET 2,855,214

FLUID PRESSURE ACTUATED HEIGHT CONTROL
FOR VEHICLE SUSPENSION

Filed March 7, 1956

United States Patent Office 2,855,214
Patented Oct. 7, 1958

2,855,214

FLUID PRESSURE ACTUATED HEIGHT CONTROL FOR VEHICLE SUSPENSION

Georges Boulet, Toulouse, France, assignor to Société à Responsabilité Limitée Recherches Etudes Production R. E. P., Paris, France, a French company Application March 7, 1956, Serial No. 570,066

Claims priority, application France June 2, 1955

5 Claims. (Cl. 280—124)

This invention relates to follow-up control devices especially suitable for vehicle suspension systems, and which comprise hydraulic jacks which may be associated with known devices, such as springs or compressed-air jacks.

In accordance with the invention there is employed an auxiliary fluid circuit independent of the principle fluid circuit of the associated jack and comprising a group of two cylinders in the interior of each of which is adapted to move a piston which separates the fluid of the jack and the auxiliary fluid. The movement of said pistons is effected by control of the circulation of the auxiliary fluid to inject auxiliary fluid into the jack or withdraw the same, the pistons always returning to their initial positions and thus displacing, in both directions, the same volume of fluid.

A particular application of this type of device relates to a vehicle suspension system having hydraulic jacks, one jack for each wheel of the vehicle, and the invention has as an object the effecting of the correction of the relative displacements of the body and associated axles produced by the various accelerations to which the vehicle may be subjected. These accelerations can be in any one of the three directions of space and the detection of these accelerations is effected by detecting members such as, for example, pendulum systems.

In the particular application described, the device is limited to transverse accelerations and, thus, to corrections of displacements due to inclinations of vehicles negotiating curves.

The pistons, which are known as dosing pistons, are operated by a valve system with slide valves comprising, for each wheel:

(1) Slide-valves actuated, for example, by the transverse accelerations resulting from the effect of turning, actuating controls being provided, for example, in the form of pendulum members which themselves actuate electro-magnets which act on the slide-valves;

(2) Slide-valves known as height-regulators which, under the control of suspension arms, keep the axes of the wheels at the same distance from the body of the vehicle, or at a distance chosen so as to give a predetermined inclination to the body.

In preferred form, a suspension jack comprises: a dosing piston for lowering operations and a dosing piston for lifting operations; a slide-valve for actuating each of the dosing pistons and a control member for the slide-valve; and, finally, a regulating slide-valve for each of the dosing pistons.

The invention will be better understood from the following description taken with reference to the attached drawings, in which:

Figures 1 to 6 are diagrammatic views illustrating the operation of a device of the invention.

Figures 1 and 2 illustrate the device for a turn and for the inner radius of the turn, the actuating slide-valve being shown in turning position in Figure 2;

Figure 3 illustrates the device in straight alignment for the inner radius of the turn;

Figures 4 and 5 illustrate the device for the outer radius of the turn, the actuating slide-valve being shown in turning position in Figure 5;

Figure 6 illustrates the device in a straight alignment for the outer radius of the turn;

Figure 10:
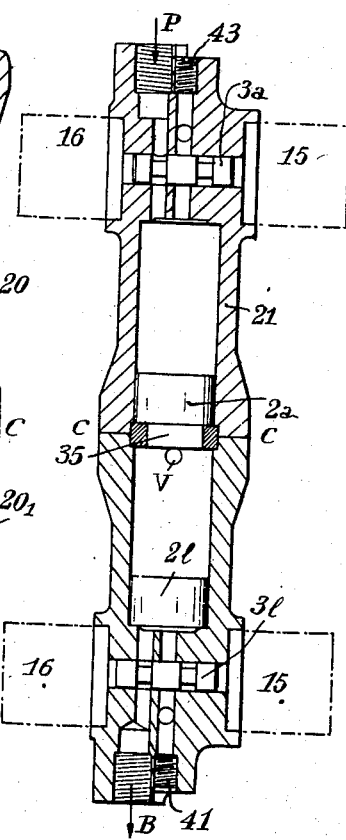
Figure 10 is a view in cross-section, taken along line XI—XI of Figure 9.

Figures 1–6 diagrammatically illustrate the operation of the apparatus shown by way of example in Figures 10 and 11. To facilitate an understanding of the operation of the device, those elements which operate positively to perform a lifting operation have been given the suffix $l$. Those elements which operate positively to perform a lowering function have been given the suffix $a$.

Figure 9:
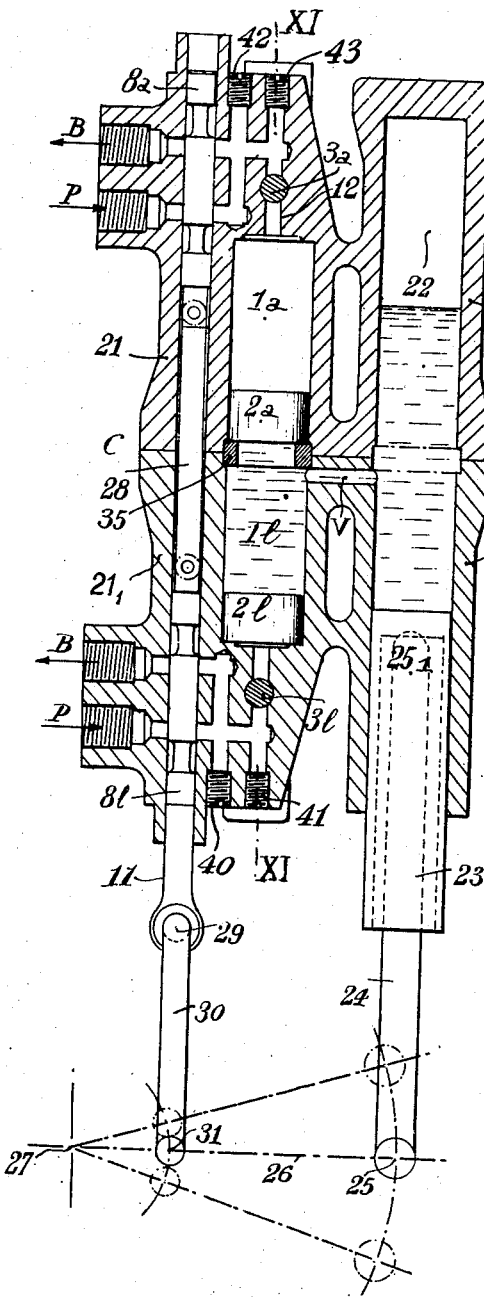
Figure 9 is a view in axial longitudinal cross-section of a form of the apparatus which combines, in a single body, the jack relative to a wheel proper and the combined assembly of its control members.

As seen in Figures 9 and 10, most of the essential elements of the system provided by the invention are combined into a single unit. A jack representing a suspended part and constituted by sections $20$ and $20_1$ is coupled via a conduit V to a chamber consisting of sections $1_a$ and $1_1$ (the latter being shown in inverted position in Figures 4–6), these sections being delimited by a cylindrical seat 35.

Floating or dosing pistons $2_a$ and $2_1$ are movably positioned in the sections $1_a$ and $1_1$ which constitute a cylinder. These cylinders may be filled alternatively by auxiliary fluid received from an external source as will be shown or by jack fluid received via conduit V from the jack which defines a compressed air chamber 22.

The jack accommodates a piston 23 which is pivotally connected to a piston rod at pivot $25_1$ whereby an action is provided which will be subsequently described in greater detail.

The movement of the pistons $2_a$ and $2_1$ is controlled by means of valves $3_a$ and $3_1$ respectively, and further, by means of valves $8_a$ and $8_1$ respectively. The valves $3_a$ and $3_1$ are respectively coupled to a pump or source of fluid under pressure P and to a reservoir or tank B (which supplied fluid to pump P) through a system of bores, some of which are plugged by plugs 40, 41, 42 and 43. The valves $8_a$ and $8_1$ can be, by virtue of their own action as controlled by a link 11 actively associated with pump P or reservoir B to pass or receive fluid to and from the valves $3_a$ and $3_1$.

As diagrammatically indicated in Figure 1, the piston $2_a$ is normally positioned in the cylinder section $1_a$ in a position which is closest to the conduit V. The piston $2_a$ is movable, however, to position $2'$ as indicated by dotted lines.

The normal position of piston $2_1$ in cylinder section $1_1$ is that position at which the piston is furthest removed from conduit V and this piston is susceptible of being moved to position $2'$ as indicated by dotted lines in Figure 4. Thus, in Figures 9 and 10, pistons $2_a$ and $2_1$ are shown in normal position.

Figures 1–6 indicate that valves $3_a$ and $3_1$, better known as actuating valves, are controllable by members such as rods 6 and 7. These rods can be controlled by means of electro-magnets 16 and 15 diagrammatically illustrated in Figure 11. The operation of these electro-magnets will be subsequently described.

As shown in Figure 3, with the valve $3_a$ displaced downwardly, the pump P is coupled via a non-return valve 14 through a valve $r_3$ and a conduit 13 through valve passage $4_a$ and conduit 12 to cylinder section $1_a$. Piston $2_a$ is seated against seating member 35 (see Figure 10) and maintained in this position.

However, upon being actuated as shown in Figure 2, valve $3_a$ is displaced in such a manner as to couple valve $8_a$ to cylinder section $1_a$ via valve passage 5. The connection of cylinder section $1_a$ to pump P or reservoir B is then controlled by the position of valve $8_a$, whose position depends upon the operation of link 11 connected to the suspension system of the vehicle. Valves $8_a$ and $8_1$ comprise outlet ports $9_a$ and $9_1$, respectively, for connection with tank B and inlet ports $10_a$ and $10_1$ for connection with pump P.

Figure 5:
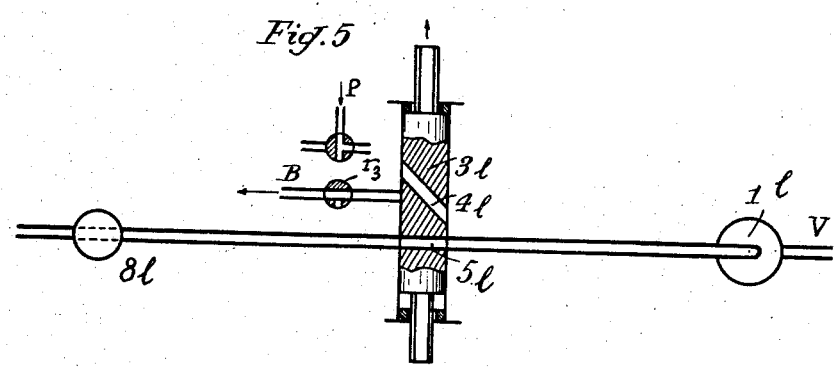
Figure 6:
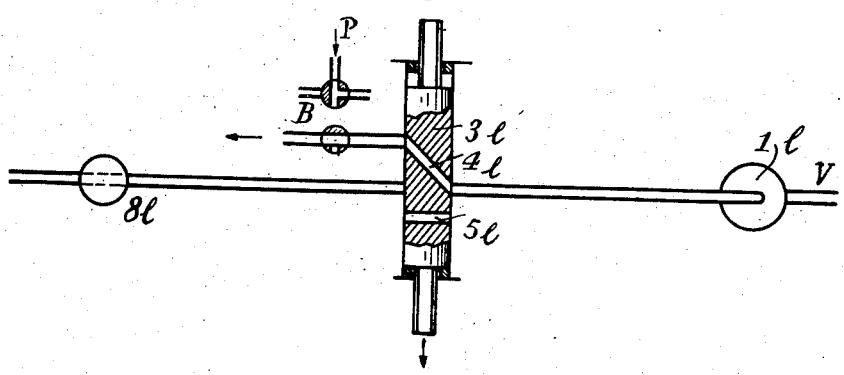

Figures 4–6 indicate a similar type of operation for the corresponding lifting members and it will be noted that the valves $3_a$ and $3_1$ and valves $8_a$ and $8_1$ which are connected by means of a link 28 are all housed in a unit consisting of sections 21 and $21_1$.

Link 11 is coupled at pivot 29 to a link 30. Piston 23 is pivoted at pivot $25_1$ to link 24. Links 24 and 30 are respectively pivoted by pivots 25 and 31 to a shaft or rod 26 which is itself coupled to a shaft 27 whose axis is perpendicular to the plane of the drawing in Figure 9. The shaft 27 has a fixed position relative to the associated wheel (not shown) and does not rotate therewith. Consequently, the shaft 27 constitutes a suspending part.

From an inspection of Figure 9 it will appear that with the piston $2_a$ in its normal position, as illustrated, the rising of piston $2_1$ will cause jack fluid to flow through conduit V into the jack whereupon piston 23 will be displaced outwardly thereof. With piston $2_1$ in its normal position and piston $2_a$ displaced upwardly in Figure 9, jack fluid will be withdrawn from the jack via conduit V. Piston 23 will thus be drawn into or permitted to move upwardly in the jack. The illustrated positions of pistons $2_a$ and $2_1$ are provided for the mean level of fluid in the jack as illustrated and consequently section $1_a$ is normally coupled via valve pasage $4_a$ to the pump P as shown in Figure 3 and cylinder section $1_1$ is normally coupled to reservoir B by valve passage $4_1$ as shown in Figure 6.

This normal relationship of the elements is not disturbed until electro-magnets 16 and 15 are actuated by reason of the actuation of the steering column of the vehicle or by some like means as will be explained. However, upon an actuation of valves $3_a$ and $3_1$ by the electro-magnets, the control of piston $2_a$ and $2_1$ is then affected by means of valves $8_a$ and $8_1$. These latter valves which are sometimes known as regulating valves are controlled by the suspension of the vehicle through links 11 to compensate for movements of the suspension system by appropriately connecting either pump P or reservoir B to cylinder sections $1_a$ and $1_1$. Accordingly, the auxiliary fluid in sections $1_a$ and $1_1$ is controlled by the suspension system which is rendered effective or ineffective when a turn or a straight-away is encountered and the jack thus compensates for suspension changes as is diagrammatically indicated in Figures 1–6.

Figure 7:
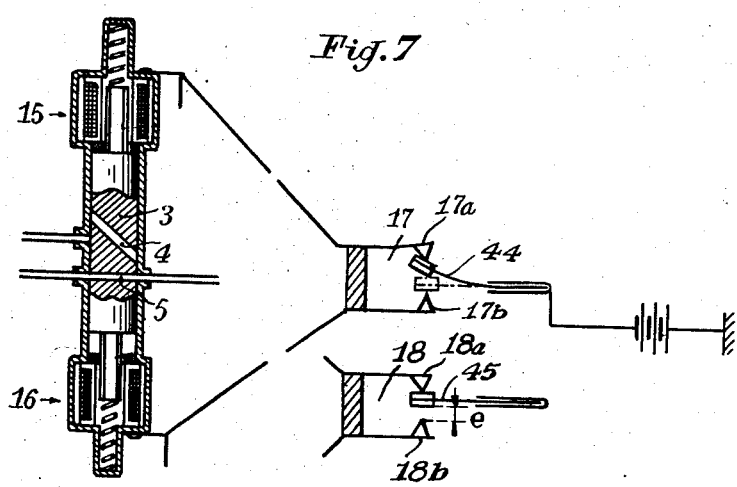
Figure 7 shows the detail of a control for actuating a slide-valve.
Figure 8:
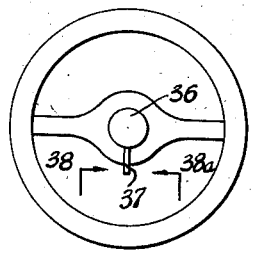
Figure 8 shows schematically an alternative form of the control for the actuating slide-valves.

Figures 7 and 8 show respectively and diagrammatically apparatus contemplated by the invention for controlling the above noted valves $3_a$ and $3_1$. As has been indicated these valves are controlled by electro-magnets 15 and 16 and the electro-magnets are in turn and as indicated by Figure 7 controlled by sets of contacts 17 and 18. Intermediate the sets of contacts in units 17 and 18 are positioned 2 pendulum members 44 and 45, respectively. In response to a turn in one direction the pendulum 44 leaves the contact 17$b$ with which it is normally in contact and makes contact with the contact 17$a$ thereby coupling an associated source of power to the electro-magnets 15. Conversely and for an opposite turn, the pendulum member 45 leaves contact 18$a$ and makes contact with the contact 18$b$ thereby actuating electro-magnet 16. The distance $e$ indicates simply the distance through which a pendulum member must travel in order to appropriately apply an electrical potential to the associated electro-magnet and this distance may be adjusted to account for a predetermined centrifugal force.

In Figure 8 is indicated a much more simple apparatus in which a contact 37 is positioned on a shaft 36 which is used for steering, the contact 37 being positioned intermediate contacts 38 and 38$a$. It will be apparent that upon a turning of the shaft 36, the contact 37 will make contact with one or the other of contacts 38 and 38$a$ whereupon an associated electro-magnet can be appropriately actuated.

Upon an actuation of one of the electro-magnets the associated valve $3_a$ or $3_1$ is rendered active and the operation indicated above is performed. Consequently, the valves $3_a$ and $3_1$ are responsive to a turning of the vehicle.

There will now be obvious to those skilled in the art many modifications and variations of the structure set forth. These modifications will not however depart from the spirit of the invention as defined in the following claims.

What is claimed is:

1. A suspension control device for limiting the displacement of suspended and suspending parts of a vehicle comprising a source of fluid pressure, a tank supplying fluid to the source, a fluid pressure suspension jack, two regulating valves each having a fluid pressure inlet port connectible to said source and an outlet port connectible to the tank, said valves being similarly positioned and actuatable simultaneously in response to displacements of the suspended and suspending parts and being both closed at rest and respectively open for opposite turns; lines for the transmission of fluid; two cylinders each having one end connected by one of said lines to one of said valves and the other end connected by another of said lines to the jack; a free piston in each cylinder, a seat in one cylinder supporting the piston at rest at the valve-connected end and a seat in the other cylinder supporting the piston at rest at the jack-connected end, whereby for one cylinder a displacement of the piston from its seat forces fluid into the jack and for the other into the cylinder; two actuating valves mounted respectively in the lines connecting a regulating valve to a cylinder, said actuating valves being closed at rest; and means responsive to a turning of the vehicle for opening only one actuating valve which, in open condition and in dependence on the position of the regulating valves, causes displacement of the associated piston to control the related jack in accordance with relative displacement of the suspended and suspending parts.

2. A device as in claim 1 wherein said means comprises electro-magnets for respectively opening and closing each actuating valve, and a circuit connected to the electro-magnets and comprising switches actuatable to energize the closing electromagnet in response to a turning of the vehicle.

3. A device as in claim 2 comprising two pendulum switch actuators mounted to swing in transverse planes of the vehicle respectively in opposite directions from a position of rest at which the circuit is closed on the closing electromagnets through a predetermined angle to a position at which the circuit is closed on the opening electromagnets.

4. A device as in claim 2 comprising switch actuating means connected to the vehicle steering mechanism to close the circuit on the closing electromagnets with the mechanism substantially at neutral position and to close the circuit respectively on one or the other opening electromagnet with the mechanism rotated through a predetermined angle to one or the other side of neutral position.

5. A device as claimed in claim 1 comprising a single block housing said valve, cylinders, pistons and jacks.

References Cited in the file of this patent

UNITED STATES PATENTS 2,687,311     Nallinger                Aug. 24, 1954